2,846,375

HIGH SEALING-STRENGTH WAX COMPOSITIONS

Weldon G. Annable, Mundelein, Charles T. O'Malley, Chicago, and John W. Walsh, Crystal Lake, Ill., assignors to The Pure Oil Company, Chicago, Ill., a corporation of Ohio No Drawing. Application July 26, 1955
Serial No. 524,596

7 Claims. (Cl. 196—149)

This invention relates to a multicomponent wax composition. More particularly, this invention relates to a three-component wax composition having superior low-temperature characteristics, rendering it especially suitable as a low-temperature sealing wax and coating wax composition.

Wax compositions suitable for low temperature and normal temperature range use have in recent years become increasingly important with the expanded application of cold storage of prepared foods in both domestic and commercial freezers, that is, quick-frozen vegetables and the like. A certain amount of difficulty has arisen, especially at low temperatures, due to the brittleness and lack of adhesive sealing strength at temperatures below about 30° F. of certain wax compositions when applied to paper or similar surfaces. Since commercial and domestic coolers and freezing cabinets may operate at temperatures down to about −10 to −20° F., commercial preparations of sealing waxes and coating waxes which are applied to paper and cardboard packages, and which moisture proof containers kept in a damp, low-temperature environment, are subjected to relatively severe conditions of use.

It has been found that the usual types of paraffin wax, or other waxes, have insufficient adhesiveness and sealing strength at low temperatures to effectively seal and protect packages in freezers. Therefore, recently resort has been made to blending various types of waxes in an attempt to enhance the desired characteristics of high sealing strength and adhesiveness, moisture proofing, impregnation flexibility and the like. Blends of paraffin wax and microcrystalline wax have been used to some extent for this purpose and it has been found that, although more expensive, compositions prepared with paraffin and/or microcrystalline wax together with non-wax modifiers or synthetic waxes are superior in desired properties and the latter have found more extensive use. Despite their widespread use, however, compositions containing modifiers have the disadvantage of high cost, difficulty of preparation and less than maximum sealing strength over a wide temperature range. Not only is it important to have a wax composition which has the desired high sealing strength at low temperatures down to −10 to −20° F., but it is also important to have the wax compositions exhibit at least as effective and equally desirable characteristics at room temperatures and above.

We have discovered that by the judicious selection of certain types of waxes and by the combination of the selected types of waxes in a particular range of concentration, we are able to provide wax compositions of high sealing strength and adhesiveness, suitable for use as sealants and coating compositions both at low temperatures and room temperatures and above. Such compositions are not only superior to previous blends of natural waxes in sealing strength but are even superior to compositions of blends of natural waxes with synthetic waxes and other types of modifiers, and also are of lower cost and greater ease of preparation than some of the prior art compositions.

Therefore, it is an object of our invention to provide a high sealing-strength wax composition and a method of preparing the same.

It is also an object of our invention to provide an adhesive, high sealing-strength, three-component wax composition especially effective at low temperatures.

It is also an object of our invention to provide a low-cost high sealing-strength, wide-range, wax blend.

It is a still further object of our invention to provide a low-temperature sealing and coating wax composition of unique characteristics, low cost and ease of preparation.

Other objects, advantages and uses of our invention will be apparent from a study of this specification and the accompanying claims.

We have found that if paraffin wax, microcrystalline wax and petrolatum wax, all derived from petroleum sources, are carefully blended within a fixed range of concentrations, a homogeneous wax preparation of very low cost may be obtained which is effective at low temperatures down to about −30° F. The composition may be applied directly to the surface of paper or like materials in order to provide a smooth attractive surface and to afford moisture proofing by penetration in and bonding with the paper surface. The composition may also be used to seal two opposed paper surfaces tightly together, such as the sealing of a paper wrapping over a food carton, and the like. The coating and sealing characteristics are such that even at −30° F. the sealed junction may be pulled apart only with difficulty and the surface, paper or otherwise, to which the wax has been applied still is non-brittle and flexible enough to constitute a smooth, moisture-proof surface of protection on the paper or like material. At room temperatures and above, for example at 70 or 75° F., the wax composition still affords very high sealing strength at the juncture points, resisting separation of the plies of paper, and is non-tacky to the touch and effective as a coating composition. The prior art waxes, and wax compositions and blends, do not afford such a wide range of temperature application, nor such high sealing strength values over the entire range. Moreover, as has been pointed out above, the prior art compositions are frequently complex in nature, difficult to prepare and may involve costly and relatively scarce constituents.

In general, therefore, our invention comprises a petroleum-derived, three-component wax composition exhibiting a wide range of temperature application as a sealing and coating wax, including temperatures down to −30° F.

More particularly, our invention covers a petroleum-derived wax composition having three constituents, namely paraffin wax in 25–45% by weight (of final composition) concentration, microcrystalline wax in 10–45% concentration and petrolatum wax in 30–50% concentration. We have found that the best and most preferred wax compositions within the scope of our invention have paraffin wax present in 30–45% concentration, microcrystalline wax in 15–30% concentration and petrolatum wax in 35–50% concentration.

Paraffin wax is a macrocrystalline type of wax and has been defined by the Pharmacopoeia of the United States of America as a purified mixture of solid hydrocarbons obtained from petroleum. Paraffin wax crystals may be plate, needle, or malcrystalline, but the fully refined product is substantially free of the malcrystalline forms. The paraffin wax is usually colorless or white, more or less translucent, without odor or taste, and slightly greasy to the touch. It is insoluble in water and alcohol, and freely soluble in chloroform, ether, benzene and other solvents. The British Pharmacopoeia specifies that paraffin wax generally has a melting range of about 130° to 135° F.

Refined paraffin wax or block paraffin is a hard, crystalline, hydrocarbon wax derived from mineral oils of the mixed-base or paraffin-base type by a process of refining in which the oil is eliminated or reduced to a negligible extent. The setting points of refined paraffin wax may extend between 90° and 160° F. In fully refined paraffin wax there are apparently no hydrocarbons, excluding traces of oil, below $C_{23}H_{48}$ and the hydrocarbons may range up to $C_{29}H_{60}$. The particular methods of preparing refined paraffin wax are well known and may involve fractional distillation of crude petroleum in a cylindrical still through a number of refining steps which may include pressing the wax after chilling. The particular types of refined paraffin wax which may be used in the process of this invention and in the instant composition, are those which exhibit melting points of approximately 133–138° F. They may be prepared by the above defined process or other similar processes from suitable petroleum sources. The refined paraffin wax, as above-mentioned, is utilized in 25–45% by weight concentration, preferably 30–45% concentration, directly without further processing in the composition of this invention.

Microcrystalline wax has a fine, less apparent crystalline structure than paraffin wax and comprises a solid hydrocarbon mixture of a molecular weight averaging higher than that of paraffin wax. Microcrystalline waxes possess plastic properties over and above paraffin waxes and are obtainable from crude petroleum fractions commonly designated as heavy lubricating and cylinder oil stocks. Microcrystalline waxes of relatively low oil content, that is, below about 6% oil, are generally of high melting point, that is about 165–195° F., and those waxes highly refined and with almost no oil present may have melting points of up to and above about 200° F. All microcrystalline waxes are of about the same molecular weight and are said to be composed of hydrocarbon chains of twice the length of those of the paraffin waxes. Microcrystalline waxes, like paraffin waxes, have been extensively used to advantage as adhesives, coating agents and the like, either alone or with other waxes, or in combination or addition with various foreign materials such as resins, rubber, polymers, synthetic waxes, natural and synthetic oils and the like. Frequently, foreign materials added to modify the microcrystalline waxes have been found to be difficult to blend with the waxes, expensive, or otherwise unsatisfactory. Microcrystalline waxes have also been subjected to chemical treatments of various types, such as ozonization, chlorination, and oxidation, to vary their chemical structure and physical properties. In general, processes, addends and chemical treatments to which the microcrystalline waxes have been subjected have been costly, although improving the natural characteristics of said waxes. Microcrystalline waxes used as the microcrystalline component in the composition of our invention, have melting points of approximately 170° to 180° F., and the following other characteristics: Penetration at 77° F., above 15; viscosity at 210° F. (SUS), below 90.

The microcrystalline waxes utilized in our composition, may be obtained from Mid-Continent crudes or other petroleum sources. In the process of refining the crude, it is divided into a number of fractions, including one from which lubricating oils are ultimately derived. This fraction is further fractionated by the use of steam and/or vacuum into neutral fractions of various viscosities and a residuum. From said residuum the microcrystalline waxes utilized in this invention may be derived. During the process of separation of the microcrystalline wax, the cylinder stock or residuum is first subjected to solvent refining with phenol, sulfur dioxide or other selective solvent for aromatics, then to the normal dewaxing and deoiling procedures to produce the finished wax. The solvent refining step is usually incorporated in the procedure for the production of lubricating oils and may be left out of the process if wax alone is to be recovered. Dewaxing may be performed by any one of a number of suitable processes, including solvent extraction at low temperature and crystallization, followed by separation by centrifugation. Solvent dewaxing may employ any one of a number of suitable solvents or solvent mixtures, or solvent-anti-solvent mixtures, but preferably utilizes a mixture of methyl ethyl ketone and toluene and a ratio of solvent mixture to oil of about 1:1 to 4:1, depending on the nature and the viscosity of the charge stock. Rich solvent containing dissolved wax is separated from the contacted oil by suitable means, such as a settling tank, after which the solvent is removed from the wax. The characteristics of the wax at this stage depend to some extent on the concentration of oil present. The product from the dewaxing operation is petrolatum wax, described below in more detail. The oil content of the wax fraction may be decreased by any one of a number of deoiling methods, such as pressing to squeeze the oil out, or applying heat and/or reduced pressure. Microcrystalline wax is separated thereby, that is, by deoiling the petrolatum wax. Preferably, a second solvent extraction is performed under conditions similar to those of the first dewaxing step, except at higher temperatures. The wax may be precipitated from the solvent solution, for example, by chilling and then removed by centrifugation or the like. The dewaxing and deoiling steps are carried out in such a manner that a final microcrystalline wax product is obtained which exhibits the melting point range as above specified, that is, approximately, 170° to 180° F., and therefore has a relatively low oil content, about 0.5% by wt.

The third component of the instant invention's high sealing-strength wax composition is petrolatum wax as above mentioned. Petrolatum wax may be defined as a microcrystalline wax refined from heavy petrolatum stock, that is, by dewaxing deasphalted heavy oil raffinate, and exhibits stickiness, a melting point of approximately 155° to 165° F., and a penetration value of more than about 30. Petrolatum wax may have an oil concentration of approximately 10–25%. It is usually obtained as above-indicated, but may be produced in a number of alternate ways, for example, from acid-treated petrolatum stock containing a fairly high percentage of wax by treatment with naphtha, followed by centrifugation of the solution to remove excess oil. This wax may be again put into solution and recentrifuged to remove more oil. A further method of preparation of petrolatum wax comprises treating the bottoms or residum of the still, following fractional distillation of petroleum crude, with sulfuric acid to remove asphaltic material, neutralizing the residual oil, filtering and chilling to a temperature near freezing, and recovering the petrolatum wax precipitated therefrom. The precipitated wax is dissolved in ethylene dichloride, or in naphtha or similar solvent, and cooled to about 70–100° F., at which point a fraction precipitates. The fraction precipitating is removed and the remaining solution is further cooled to about 40° F. to precipitate out the adhesive petrolatum wax fraction, which is ready for use. A subsequent treating step may be optionally employed, that is, resolution of the petrolatum wax in a selective solvent and reprecipitation of the wax from the solvent to provide a higher melting point, narrower melting range product of lighter color. The particular petrolatum wax which may be used in the process of our invention has a melting point range of 155–165° F., penetration of more than about 30, and oil content of 15–25%. The petrolatum wax is used in 30–50% by weight of final composition, preferably in 35–50% amount.

The above three components, namely, paraffin wax, microcrystalline wax and petrolatum wax are blended together by any suitable means, that is, the waxes are melted and added to each other in any combination or sequence, preferably with stirring to assure a final homogeneous blend. Thus, a typical procedure for the preparation of the wax composition of our invention comprises simultaneously melting in separate open vessels 41 grams of refined paraffin wax of 135° F. melting point, 20 grams of microcrystalline wax of 175° F. melting point, and 39 grams of petrolatum wax of 160° F. melting point. The petrolatum wax and the microcrystalline wax are then simultaneously poured into the vessel containing the paraffin wax mixture while the wax mixture is under constant agitation by a stirrer. After the components are thoroughly blended together, the blend is removed from the vessel and is cooled below the wax blend melting point, that is, approximately 156° F. The composition after removal from the vessel is ready for use as a sealing wax and coating wax without further preparation.

Other methods of preparing our composition are also suitable, for example, heating the three solid waxes in correct proportion together in one vessel to above the melting point of each, or, adding the melted paraffin wax and melted petrolatum wax to the melted microcrystalline wax. Other equivalent methods of preparing the homogeneous wax blend are also contemplated.

The sealing strength of a number of sample compositions of our invention have been tested at a low temperature by the test method and machine which are fully described in "Sealing Strength of Paraffin Wax," Tappi, vol. 37, No. 3, pages 165A–166A, March 1954. The test method is summarized as follows:

A regular commercial 24.5–25.5 pound (24 x 36–500) coated sulphite breadwrapper, which is a sulphite sheet clay-coated on one side, about 0.0017 inch thick and with an apparent density of about 0.95 gram per cc., is conditioned in accordance with Tappi Standard T 402M for at least one week prior to coating with wax. The uncoated side of the paper is then waxed for testing purposes by means of a Meyer-Coater or a squeeze-roll coater. The paper is 5" wide and saturated with the wax to be tested which is applied at the rate of 3.5±0.5 pounds per ream of paper on the uncoated base-paper side (the side to be sealed). The quantity of wax on the surface of the paper is determined by weighing a 4" x 4" sample of the wax paper, removing the surface wax by scraping with a single-edge razor blade until a few paper fibers come off with the wax, and then reweighing the sample of paper.

Two waxed samples, 5" wide, are fastened in the jaws of the sealing machine, which is a power-driven machine designed to seal at a rate of 25" per minute at 205–210° F. at a specified angle and under a constant weight of 200 grams, so that the wax-coated surfaces are opposed. A 200 gram weight is attached to the bottom of the outside sheet furthest from the heated cylinder of the machine and the cylinder adjusted to 205–210° F. The motor is then started and the sheets are pulled over the heated cylinder at the rate of 25" per minute. The motor is shut off just as the weighted clamp is about to pass over the heated cylinder. The sealed specimen is left untouched at room temperature for 15 seconds until the wax solidifies and is then removed from the machine. The sealed samples are cut into strips 3" wide, allowing a 1" trim on each edge. A total of 10 samples are needed. The length of each test specimen must not be less than 6". These test specimens are then conditioned in accordance with Tappi Standard T 402M for 24 hours before the final testing. The sealing strength of the sealed specimens is determined by first manually separating the two paper plies along the first inch of a test specimen, clamping the ends of each ply in the jaws of the testing machine and starting the machine. The machine measures the force in grams necessary to separate a specimen, is sensitive to 1% of the minimum load applied, and operates at a rate of separation of the jaws of 5" per minute giving a uniform separation rate of the seal of 2.5" per minute. The machine is started and the plies separated so that the ends are in the same plane at an angle of 10° and the unseparated portions are at right angles to this plane. After the machine is started, at intervals of 10 secondls or more readings are taken of grams of force required to continue the separation of sealed plies, at least 5 readings being taken and the average for each specimen being divided by three to give the force in grams per inch width. The higher the value the greater the sealing strength.

The above procedure was followed in determining the sealing strength of wax compositions at low temperatures, except that the testing machine was operated in a cold box.

The following table sets forth the sealing strength and other characteristics of various blends of the high sealing-strength wax of the instant invention:

*Table 1*

| Sample No. | Composition in weight percent | | | Penetration at 77° F. (ASTM D-5-52) 0.1 mm. | Sealing Strength, gm./in. | | |
|---|---|---|---|---|---|---|---|
| | Paraffin Wax [1] | Microcrystalline Wax [2] | Petrolatum Wax [3] | | Sealing −30° F. | 0° F. | 70-75° F. |
| I | 51 | 15 | 34 | 31 | 31 | 37 | 30 |
| II | 36 | 30 | 34 | 33 | 46 | 52 | 57 |
| III | 46 | 10 | 44 | 39 | 47 | 47 | 54 |
| IV | 36 | 15 | 49 | 46 | 54 | 65 | 69 |
| V | 41 | 20 | 39 | 35 | 58 | 50 | 54 |
| VI | 25 | 46 | 29 | 31 | 61 | 49 | 69 |
| VII | 31 | 25 | 44 | 43 | 63 | 65 | 81 |

[1] The paraffin wax has the following characteristics:
Melting point _____ ° F __ 135–137
Penetration at 77° F _____ 15
Viscosity, SUS, 210° F _____ 40

[2] The microcrystalline wax has the following characteristics:
Melting point _____ ° F __ 177
Penetration at 77° F _____ 16
Viscosity, SUS, 210° F _____ 87

[3] The petrolatum wax has the following characteristics:
Melting point _____ ° F __ 160
Penetration at 77° F _____ <325
Viscosity, SUS, 210° F _____ 98

Table II

| Blend Composition | Blend No. | M. P., °F. | Pen. at 77° F. | Sealing Strength, gm./in. | | |
|---|---|---|---|---|---|---|
| | | | | Room Temp. (70–75° F.) | 0° F. | −30° F. |
| 50% microcrystalline wax [1]<br>50% paraffin wax [2] | VIII | 166.2 | 11 | 19 | 32 | 25 |
| 49.5% microcrystalline wax<br>49.5% paraffin wax<br>1% modifier X [3] | IX | 170.2 | 10 | 40 | 37 | 33 |
| 48.5% microcrystalline wax<br>48.5% paraffin wax<br>3% modifier X | X | 180.3 | 10 | 23 | 40 | 40 |
| 47.5% microcrystalline wax<br>47.5% paraffin wax<br>5% modifier Y [4] | XI | 161.4 | 15 | 19 | 37 | 34 |
| 45% microcrystalline wax<br>45% paraffin wax<br>10% modifier Y | XII | 158.4 | 20 | 25 | 46 | 42 |
| 47% microcrystalline wax<br>47% paraffin wax<br>5% modifier Y<br>1% modifier X | XIII | 174.3 | 14 | 25 | 35 | 35 |
| 44.5% microcrystalline wax<br>44.5% paraffin wax<br>10% modifier Y<br>1% modifier X | XIV | 173.8 | 19 | 27 | 41 | 36 |
| 46% microcrystalline wax<br>46% paraffin wax<br>5% modifier Y<br>3% modifier X | XV | 181.5 | 13 | 28 | 45 | 41 |
| 43.5% microcrystalline wax<br>43.5% paraffin wax<br>10% modifier Y<br>3% modifier X | XVI | 182.7 | 17 | 29 | 42 | 41 |
| 41% paraffin wax<br>20% microcrystalline wax<br>39% petrolatum [5] | XVII | 150.7 | 37 | 85 | 66 | 48 |
| Paraffin wax [6] | XVIII | 139.2 | 11 | 6.0 | | |

[1] Microcrystalline wax of the following characteristics:
Melting point _____ °F __ 175
Penetration at 77° F _____ 16
Viscosity, SUS, 210° F _____ 86

[2] Paraffin wax of the following characteristics:
Melting Point _____ °F __ 135–137
Penetration at 77° F _____ 16
Viscosity, SUS, 210° F _____ 39

[3] Modifier X (Semet Poly 6) is a wax modifier of the following characteristics: mol. wt.=5000–6000.
[4] Modifier Y (Special Oil W) is a wax modifier of the following characteristics: °API=24.1; SUS @ 210° F.=169.1; Flash, °F.=575; Fire, °F.=650; Pour, °F.=0.
[5] Petrolatum wax of the following characteristics:
Melting point _____ °F __ 162
Penetration at 77° F _____ <325
Viscosity, SUS, 210° F _____ 100

[6] A paraffin wax of 0% oil, and viscosity at 210° F. SUS of 40.

It is seen from the above tables that the high sealing-strength wax composition of the instant invention shows a significantly improved sealing strength over the entire range tested, that is, from 70–75° F. down to −30° F., over a number of standard sealing-war compositions concomitantly tested. The composition of our invention also has a low cost of preparation. As shown by Table I, the highest sealing strength was exhibited by sample VII, which had a composition of 31% paraffin, 25% microcrystalline wax and 44% petrolatum wax. This optimal composition showed sealing strengths of 63 grams/inch at −30° F., 65 at 0° F., and 81 at 70–75° F. Concentrations of paraffin wax below that of the optimal composition and accordingly higher concentrations of either or both of the other two wax components, resulted in lower sealing strengths as, for example, in sample VI, whereas compositions of higher concentrations of paraffin wax and accordingly lower concentrations of either or both of the other two wax components, as in samples I through V also resulted in lower sealing strength values than with sample VII. When the results obtained with sample VII are compared with those obtained utilizing paraffin wax alone or with microcrystalline wax, and modifier X or Y, or both X and Y with the microcrystalline wax and paraffin wax combination, it is seen that the sealing strengths were greatly diminished. Thus, for example, sample XVI in Table II in which the microcrystalline wax appears in 43.5% concentration and the paraffin wax appears in the same concentration, together with 10% modifier Y and 3% modifier X, showed a sealing strength at 70–75° F. of only 29, at 0° F. of 42 and at −30° F. of 41. Sample VII of Table I had approximately double the sealing strength of sample XVI of Table II. Paraffin wax alone, as seen in sample XVIII, had a very low sealing strength even at room temperature. No other combination of wax components approached that of the composition of our invention, namely, paraffin wax in 25–45% concentration, microcrystalline wax in 10–45% concentration and petrolatum wax in 30–50% concentration, in high sealing strength over the entire temperature range tested.

The high sealing-strength composition of this invention is not only useful as a coating and sealing compound over wide temperature ranges, but may also be used as an impregnating agent, a moisture-proofing or surface-treating agent, or any other type of wax agent wherein the particular properties of the composition may be utilized to advantage. Color compounds and other materials are contemplated for use as additives to the instant wax blend, whose properties, other than high sealing strength and flexibility at low temperature, together with adhesiveness, may be modified in any useful way by the addition of such substances.

We claim and particularly point out as our invention:

1. A petroleum-derived wax composition of high sealing strength consisting of approximately 25–45% by weight of final composition of refined paraffin wax, about 10–45% by weight of final composition of a microcrystalline wax of about 170–180° F. melting point and about 30—50% by weight of final composition of petrolatum wax.

2. A composition in accordance with claim 1 which exhibits high sealing strength at low temperatures, in which said paraffin wax is a refined paraffin wax of about 133–138° F. melting point, and in which said petrolatum wax has an oil concentration of approximately about 15–25% by weight, a melting point range of 155 to 165° F. and a penetration greater than 30.

3. A composition in accordance with claim 2 which has a sealing strength at −30° F. of at least about 45 grams per inch, a sealing strength at 0° F. of at least about 47 grams per inch and a sealing strength at 70–75° F. of at least about 50 grams per inch.

4. A composition in accordance with claim 3 in which said paraffin wax is present in a concentration of about 30–45% by weight of final composition, in which said microcrystalline wax is present in a concentration of at least about 15–30% by weight of final composition and in which said petrolatum wax is present in a concentration of at least about 35–50% by weight of final composition.

5. A composition in accordance with claim 4 in which said paraffin wax is present in a concentration of about 31% by weight of final composition, in which said microcrystalline wax is present in a concentration of about 25% by weight of final composition and in which said petrolatum wax is present in a concentration of about 44% by weight of final composition.

6. A composition in accordance with claim 5 which has a sealing strength in grams per inch at −30° F. of at least about 60, at 0° F. of at least about 60 and at 70–75° F. of at least about 80.

7. A high sealing-strength, petroleum-derived wax composition consisting of about 41% by weight of final composition of refined paraffin wax of 135–137° F. melting point, about 20% by weight of final composition of microcrystalline wax of about 175° F. melting point, and about 39% by weight of final composition of petrolatum wax of about 155–165° F. melting point, said composition having a sealing strength at −30° F. of at least about 45, at 0° F. of at least about 65 and at 70–75° F. of at least about 80 grams per inch.

References Cited in the file of this patent
UNITED STATES PATENTS

| | | |
|---|---|---|
| 2,015,739 | Winning | Oct. 1, 1935 |
| 2,102,516 | Coster | Dec. 14, 1937 |
| 2,348,689 | Abrams et al. | May 9, 1944 |
| 2,373,634 | Wagner | Apr. 10, 1945 |
| 2,399,521 | Tyler | Apr. 30, 1946 |

UNITED STATES PATENT OFFICE
CERTIFICATE OF CORRECTION

Patent No. 2,846,375                                                              August 5, 1958

Weldon G. Annable et al.

It is hereby certified that error appears in the printed specification of the above numbered patent requiring correction and that the said Letters Patent should read as corrected below.

Column 6, line 37, for "$10°$" read -- $180°$ --; line 40, for "secondls" read -- seconds --; column 7, line 49, for "sealing-war" read -- sealing-wax --.

Signed and sealed this 25th day of November 1958.

(SEAL)
Attest:

KARL H. AXLINE                                                    ROBERT C. WATSON

Attesting Officer                                            Commissioner of Patents